Figure 1:
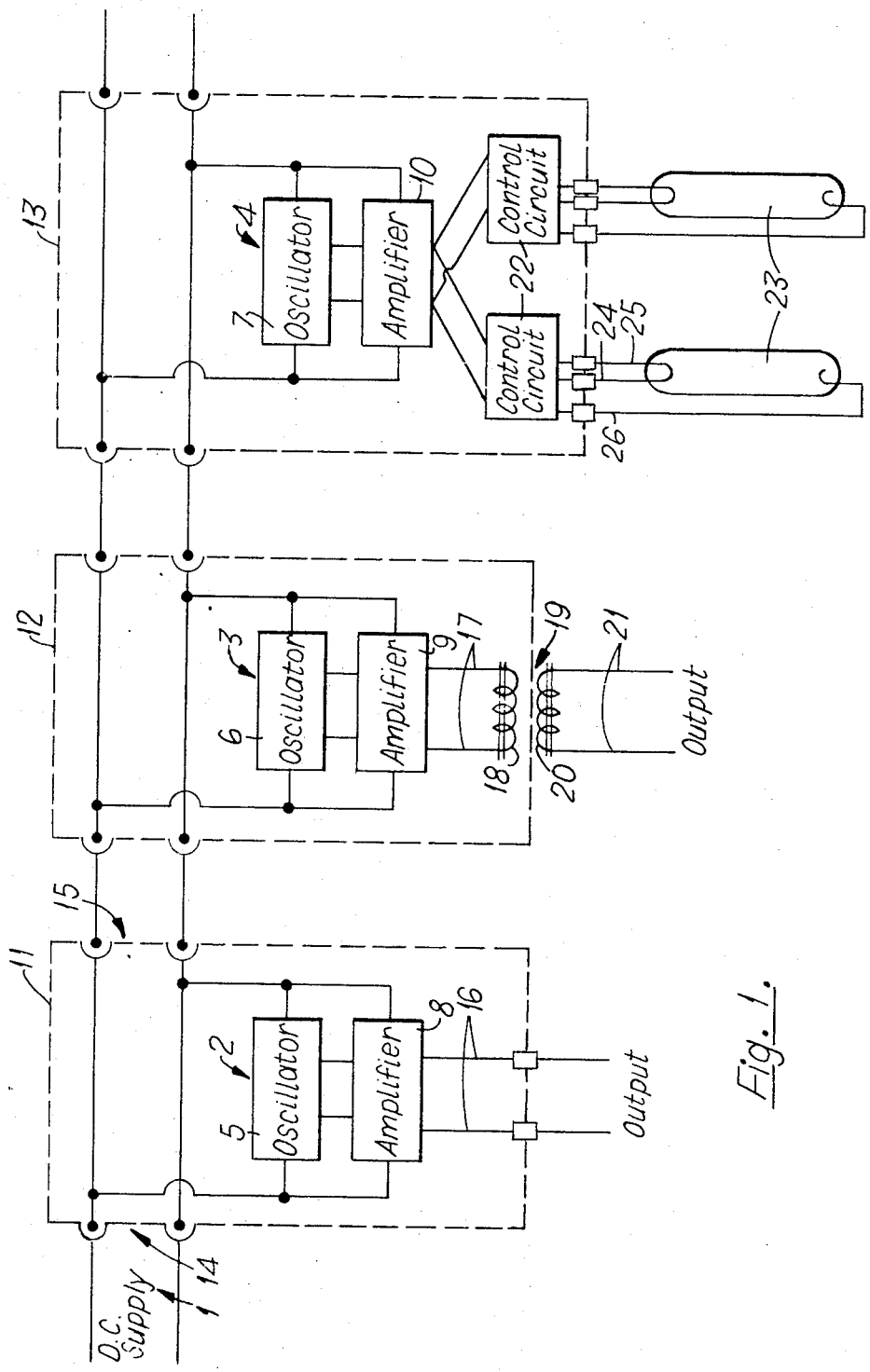

United States Patent [19]

Roberts

[11] 3,801,865

[45] Apr. 2, 1974

[54] SYSTEM FOR SUPPLYING ELECTRIC POWER TO LOADS IN HAZARDOUS ATMOSPHERES

[75] Inventor: Frank B. Roberts, Gateshead, England

[73] Assignee: Victor Products (Wallsend) Ltd., Wallsend, Northumberland, England

[22] Filed: Nov. 9, 1972

[21] Appl. No.: 304,896

[30] Foreign Application Priority Data
Nov. 18, 1971 Great Britain.................... 53634/71

[52] U.S. Cl...................... 315/187, 331/45, 331/46, 315/95
[51] Int. Cl...................... H05b 37/00, H05b 39/00
[58] Field of Search.......... 331/46, 62, 63, 68, 113, 331/144; 315/95, 187, 188

[56] References Cited
UNITED STATES PATENTS
2,622,601 12/1952 Nemec.............................. 331/46 X
3,139,530 6/1964 Demotte.......................... 331/46 X
3,213,388 10/1965 Rothschild........................... 331/45
3,323,013 5/1967 Lord.................................. 315/187

Primary Examiner—Andrew J. James
Attorney, Agent, or Firm—Kemon, Palmer & Estabrook

[57] ABSTRACT

In a power supply system for use in hazardous conditions, such as in mines, an inverter housed within a flame-proof enclosure is connected to a d.c. supply line and generates an a.c. output around the lower end of the kiloHertz range, e.g. up to approximately 100 kHz. The output may be connected to a load, such as a fluorescent lamp, either directly, or through a connector comprising a transformer having separable primary and secondary windings, or via a control circuit which provides an intrinsically safe supply.

9 Claims, 2 Drawing Figures

SYSTEM FOR SUPPLYING ELECTRIC POWER TO LOADS IN HAZARDOUS ATMOSPHERES

This invention relates to electric power supply systems, and particularly to systems for supplying alternating current to loads, such as lamps, in atmospheres which are hazardous because they contain flammable mixtures of gases, vapours and/or dusts.

Where electrical apparatus is to be used in situations where such atmospheres are present or may be present, it is essential that the apparatus is designed so that the gases, etc. cannot be ignited outside the apparatus by sparks or high temperatures caused by either normal or faulty operation of the apparatus.

There are a number of different design concepts for the apparatus, each providing its own degree of safety. Firstly the apparatus may be inherently non-sparking and incapable of generating high temperatures, but such an ideal apparatus may be impossible to achieve. Secondly, the apparatus may be such that the generation of sparks or high temperatures is so improbable that the apparatus may be regarded as inherently safe. This is the concept of "increased safety."

Thirdly, all potentially dangerous components of the apparatus may be enclosed in a casing of such strength and with such small clearances between mating parts as to ensure that any explosion which occurs inside the casing is not transmitted outside the casing. Such a casing is generally known as a "flame-proof enclosure."

Lastly, the apparatus may operate at such low energy levels that any sparks which may occur will have insufficient energy to ignite the gases, etc., and dangerously high temperatures are not encountered. Such apparatus is said to be "intrinsically safe."

Some loads, such as fluorescent lamps and their control circuits, are best operated at a relatively high frequency, for example at or around the lower end of the KHz range, up to, say, 100 KHz, particularly if the lamp must be supplied in an intrinsically safe manner. Furthermore, where loads have to be connected to an a.c. supply via plug and socket connectors, non-sparking, magnetically-coupled connectors of the type described in co-pending British Pat. application No. 3095/71 may be used. For a given size of transformer forming the connector, a substantially higher output voltage can be obtained from the secondary winding (i.e. the plug winding) if the frequency of the supply is increased above the normal a.c. supply mains frequency. Again, frequencies at or around the lower end of the KHz range up to about 100 KHz are suitable.

Although it would be feasible to generate the high frequency at a point remote from the load and feed the supply along a cable, this would be unsatisfactory, particularly if the cable is to feed a number of separate loads, for example a long line of light fittings spaced apart along a coal face. The attenuation in the cable, particularly in the cables which are at present available for use in such situations at an economic price, would be excessive at the high frequency, and an unacceptable power loss would result. Furthermore, the attenuation would result in a substantially decreasing voltage at successive light fittings along the cable. The problem is accentuated if the environment also imposes a restrictive upper limit on the supply voltage.

It is an object of the present invention to provide a power supply system which overcomes the problem of transmission of the required relatively high frequency along a cable, and which supplies one or more loads with a degree of safety at least up to "flame-proof" standard.

According to the invention, a power supply system for use in hazardous conditions comprises a d.c. supply line to which is connected at least one inverter housed in a flame-proof enclosure and operative to generate an a.c. output having a frequency at or around the lower end of the KHz range up to approximately 100 KHz.

Preferably the inverter comprises either an oscillator feeding a power amplifier, or a power oscillator.

The inverter may feed the primary winding of a connector of the type described in the above-mentioned co-pending Application, and the primary winding may also be housed in the flame-proof enclosure.

Alternatively, the inverter may feed one or more fluorescent lamp control circuits, preferably of the kind shown in the accompanying drawings and described more fully in co-pending British Pat. application No. 53633/71, which circuit or circuits may be also housed in the enclosure, to provide an intrinsically safe supply to the or each lamp.

The system may comprise a single d.c. supply line feeding a number of said inverters which are preferably housed in separate flame-proof enclosures, each inverter supplying one or more loads.

The through connection of the d.c. supply line from one inverter to the next in succession is preferably made by providing a T-junction within the enclosure housing the first-mentioned inverter.

Figure 2:
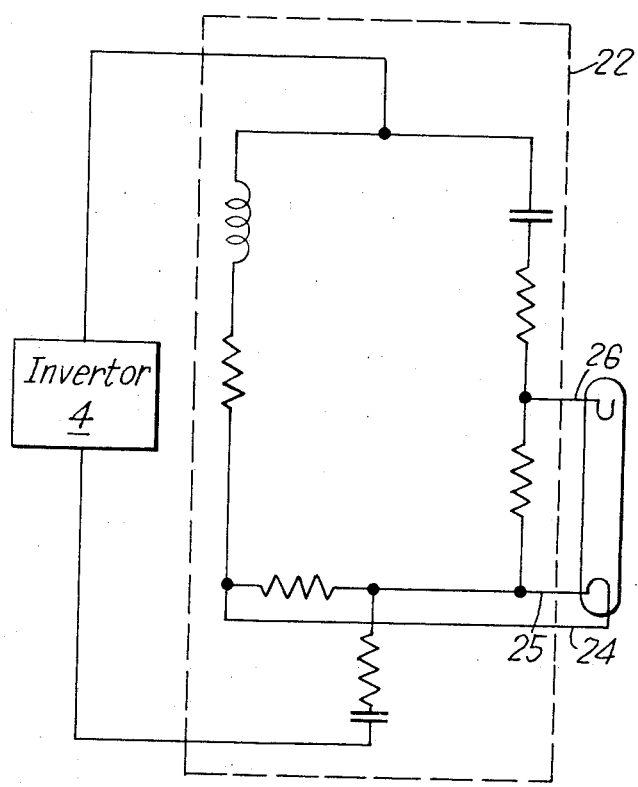

Embodiments of the invention will now be described, by way of example, with reference to the accompanying drawings, in which:

FIG. 1 is a block schematic diagram of a supply system showing a number of different HF output arrangements, and FIG. 2 is a circuit diagram of a fluorescent tube control circuit forming one of the alternative output arrangements of FIG. 1.

Referring to FIG. 1 of the drawings, a power supply system comprises a d.c. supply line 1 which is connected to inverters 2, 3 and 4, comprising oscillators 5, 6 and 7, respectively, and power amplifiers 8, 9 and 10, respectively.

Each of the inverters 2, 3 and 4 is housed in a flame-proof enclosure 11, 12 and 13 respectively. The d.c. supply line 1 is connected to the inverter 2 by way of a flame-proof connector 14 in the wall of the enclosure. A T-junction is formed within the enclosure 11 so that the d.c. supply line can extend from the enclosure, via a flame-proof connector 15, to the enclosure 12. Similar connections are made to the subsequent inverters.

Each of the inverters 2, 3 and 4 is arranged to generate a power supply having a frequency at or around the lower end of the KHz range (up to about 100 KHz), for example 26 KHz.

The HF output from the amplifier 8 is brought out of the enclosure on lines 16, which pass through the wall of the enclosure 11 in a conventional flame-proof manner. The supply on the line 16 may be connected to any suitable load.

The inverter 3 in the enclosure 12 is similar to the inverter 2 but the output arrangement is different. In this case, the output of the amplifier 9 is fed on lines 17 to the primary winding 18 of a transformer 19. The winding 18 and the lines 17 are completely enclosed within the enclosure 12. A secondary winding 20 of the transformer is situated on the outside of the enclosure and delivers HF power over lines 21 to a load (not shown). The transformer 19 forms a magnetic plug and socket arrangement of the type described in co-pending British Pat. application No. 3095/71.

The output of the amplifier 10 in the enclosure 13 is fed to two control circuits 22 for operating fluorescent lamps 23. The control circuits 22 are both contained within the enclosure 13 and provide an intrinsically safe supply to each of the lamps 23, mounted outside the enclosure. Each control circuit supplies a heated cathode of the respective lamp over lines 24 and 25, and supplies the other electrode of the lamp over a line 26. The lines 24, 25 and 26 are brought out of the enclosure 13 in a flame-proof manner, but since the supply on these lines is intrinsically safe, the lines can be connected to apparatus outside the enclosure 13 without having to satisfy flame-proof requirements.

Each control circuit 22 may be of the kind described in co-pending British Pat. application No. 53633/71, and shown in FIG. 2 of the drawings accompanying this specification. The invertor 4, when used in conjunction with this circuit, provides an output of 70 volts at a frequency of 26 KHz.

Although in the above description each invertor 2, 3 and 4 comprises an oscillator driving a power amplifier to provide the necessary high frequency output, alternatively the inverter could be of any other suitable form. For example, a power oscillator or a rotary invertor might be used. However, where a source of stabilised voltage and frequency is required, the above-described oscillator and amplifier arrangement is particularly satisfactory since it is substantially immune to even quite large voltage variations on the d.c. supply line 1. Each oscillator and amplifier may include solid state and/or thermionic devices.

A supply system in accordance with the invention could comprise a d.c. supply line feeding a single invertor arranged in the manner of any of the above-described invertors 2, 3 and 4, and feeding its respective load as described. Alternatively, in a supply system the d.c. line may feed any combination and any number of such invertors. In a typical system, the d.c. supply line may feed a number of successive invertors, such as the invertor 4, each driving one or more control circuits for fluorescent lamps. Although the control circuits are shown within the enclosure 13, they may, of course, be contained within their own enclosures. Instead of the control circuit described in co-pending British Pat. application No. 53633/71, each invertor could drive one or more fluorescent lamps each having its own safety circuit such as described in co-pending British Pat. application No. 3094/71.

In the above description, the through d.c. line connections between successive invertors are made within the flame-proof enclosures containing the invertors. However, T-junctions to the line might be provided outside the enclosures, but each such T-junction and all d.c. connections to the invertors would have to be flame-proofed.

I claim:

1. A power supply system for use in hazardous atmospheres comprising:
   a flame proof enclosure;
   at least one inverter means housed within said enclosure;
   a direct current power supply line outside said enclosure and arranged to feed DC power into said enclosure via flame proof means to said inverter means from which DC power said inverter means produces an alternating current output having a frequency from the lower end of the kiloHertz range up to approximately 100 KHz; and
   means for connecting said alternating current output to load means.

2. A system as claimed in claim 1, in which said inverter means comprises an oscillator and a power amplifier coupled to the output of the oscillator.

3. A system as claimed in claim 1, in which said inverter means comprises a power oscillator.

4. A system as claimed in claim 1, in which the a.c. output is applied to output cable means which extends out of the enclosure in a flame-proof manner.

5. A system as claimed in claim 1, including a connector for connecting the a.c. output to a load, the connector comprising separable primary and secondary windings of a transformer.

6. A system as claimed in claim 5, in which the primary and secondary windings are respectively inside and outside the enclosure.

7. A system as claimed in claim 1, including a control circuit coupled to the invertor output and disposed within the enclosure, which control circuit is operative to provide at least one intrinsically safe supply for connection to a load outside the enclosure.

8. A system as claimed in claim 1, including a plurality of said inverter means mounted in separate enclosures and connected to a common d.c. line.

9. A system as claimed in claim 8, in which inverter means are connected to the d.c. line in a string, the line entering each enclosure in a flame-proof manner and emerging from the enclosure in a flame-proof manner for entry into the next successive enclosure.

* * * * *